(12) United States Patent
Wei et al.

(10) Patent No.: US 9,382,828 B2
(45) Date of Patent: Jul. 5, 2016

(54) SYSTEM, METHOD, AND APPARATUS FOR AFTERTREATMENT SYSTEM MONITORING

(71) Applicant: Cummins Emission Solutions Inc., Columbus, IN (US)

(72) Inventors: Xi Wei, Asbury, IA (US); David Everard, Columbus, IN (US); Baohua Qi, Columbus, IN (US); Mickey R. McDaniel, Greenwood, IN (US); Edmund P. Hodzen, Columbus, IN (US); Guoquiang Li, Indianapolis, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 110 days.

(21) Appl. No.: 14/047,607

(22) Filed: Oct. 7, 2013

(65) Prior Publication Data
US 2014/0033683 A1    Feb. 6, 2014

Related U.S. Application Data

(63) Continuation of application No. PCT/US2012/032436, filed on Apr. 5, 2012.

(60) Provisional application No. 61/472,177, filed on Apr. 5, 2011.

(51) Int. Cl.
*F01N 3/00* (2006.01)
*F01N 3/10* (2006.01)
(Continued)

(52) U.S. Cl.
CPC  *F01N 3/10* (2013.01); *F01N 3/208* (2013.01); *F01N 11/00* (2013.01);
(Continued)

(58) Field of Classification Search
CPC ..... F02D 41/029; F01N 3/0842; F01N 3/035; F01N 13/02
USPC .................... 60/273, 274, 285, 286, 295, 301
See application file for complete search history.

(56) References Cited

U.S. PATENT DOCUMENTS

| 7,526,950 B2 | 5/2009 | Van Nieuwstadt et al. |
| 8,024,921 B2 | 9/2011 | Walz et al. |

(Continued)

FOREIGN PATENT DOCUMENTS

| EP | 2141332 A1 | 1/2010 |
| WO | WO 2009/071994 A2 | 6/2009 |
| WO | 2010125725 A1 | 11/2010 |

OTHER PUBLICATIONS

International Search Report and Written Opinion of the International Searching Authority, International PCT Application No. PCT/US2012/032436, Jun. 29, 2012, 9 pages.

(Continued)

*Primary Examiner* — Patrick Maines
(74) *Attorney, Agent, or Firm* — Taft Stettinius & Hollister LLP

(57) ABSTRACT

A method includes determining whether a urea refill event is detected, and clearing a quality accumulator value and clearing a latching abort command. The method includes determining whether urea fluid quality check abort conditions are met, and clearing the urea quality accumulator, latching the abort command, and exiting the reductant fluid quality check. In response to the abort conditions not being met, incrementing the urea quality accumulator according to an amount of urea being injected, and comparing the accumulated urea quantity to a low test threshold. The method includes, in response to the accumulated urea quantity being greater than the low test threshold, comparing the accumulated urea quantity to a high test threshold, and in response to the urea quantity being greater than the high test threshold, determining whether the a $NO_x$ exceedance is observed and clearing a urea quality error in response to the $NO_x$ exceedance not being observed.

20 Claims, 9 Drawing Sheets

(51) Int. Cl.
*F01N 3/20* (2006.01)
*F01N 11/00* (2006.01)

(52) U.S. Cl.
CPC ........ *F01N 2550/05* (2013.01); *F01N 2610/02* (2013.01); *F01N 2610/142* (2013.01); *F01N 2900/1806* (2013.01); *F01N 2900/1814* (2013.01); *F01N 2900/1818* (2013.01); *Y02T 10/24* (2013.01); *Y02T 10/47* (2013.01)

(56) References Cited

U.S. PATENT DOCUMENTS

| | | |
|---|---|---|
| 8,166,749 B2 | 5/2012 | Gady |
| 8,171,720 B2 | 5/2012 | Wang et al. |
| 8,225,597 B2 | 7/2012 | Girard et al. |
| 8,281,572 B2 | 10/2012 | Chi et al. |
| 2005/0207936 A1* | 9/2005 | Berryhill et al. ................ 422/63 |
| 2005/0287034 A1 | 12/2005 | Wills et al. |
| 2008/0022658 A1* | 1/2008 | Viola et al. ...................... 60/286 |
| 2008/0178575 A1* | 7/2008 | Shaikh et al. .................. 60/274 |
| 2008/0178656 A1 | 7/2008 | Nieuwstadt et al. |
| 2008/0276598 A1* | 11/2008 | Gresens ......................... 60/286 |
| 2009/0049899 A1 | 2/2009 | Hjorsberg et al. |
| 2009/0293451 A1* | 12/2009 | Kesse .............................. 60/274 |
| 2010/0037599 A1* | 2/2010 | Toshioka et al. ................ 60/295 |
| 2012/0000270 A1* | 1/2012 | Narita ......................... 73/23.31 |

OTHER PUBLICATIONS

PartiaL supplementary European search report dated Jan. 21, 2015, EP App. No. 12767966.0 PCT/US2012032436.

* cited by examiner

| ε | NORMALIZED η | FAULT |
|---|---|---|
| FAIL | FAIL | COMPONENT FAILURE: CATALYST, DOSING, OR REDUCTANT |
| FAIL | PASS | COMPONENT FAILURE: DOSING OR REDUCTANT |
| PASS | FAIL | COMPONENT FAILURE: CATALYST OR REDUCTANT |
| PASS | PASS | PASS |

SYSTEM, METHOD, AND APPARATUS FOR AFTERTREATMENT SYSTEM MONITORING

CROSS-REFERENCE TO RELATED APPLICATIONS

The present application is a continuation of International Application PCT/US2012/032436 filed on Apr. 5, 2012, which claims priority to Provisional Application No. 61/472,177 filed on Apr. 5, 2011, each of which is incorporated herein by reference in its entirety.

BACKGROUND

The technical field generally relates to aftertreatment systems for internal combustion engines. The introduction of aftertreatment systems into the exhaust systems of internal combustion engines also introduces a number of related challenges and drawbacks.

In one example, a $NO_x$ reduction system provides a capability to reduce $NO_x$ emissions from the engine. However, it is desirable to detect whether the $NO_x$ reduction system is properly or sufficiently reducing $NO_x$ gases. One method to determine whether the $NO_x$ reduction system is operating properly is to put a $NO_x$ sensor downstream of the $NO_x$ reduction system. However, in certain engine operating conditions, the system will be operating properly, yet the engine will be producing enough $NO_x$ that the $NO_x$ sensor detects $NO_x$ output and the system may appear to be in a failed condition. At certain engine operating conditions, the engine may be producing a small amount of $NO_x$ such that even a failed $NO_x$ reduction system is capable of converting virtually all of the presented $NO_x$ and the system may appear to be operating properly.

Certain systems for aftertreatment rely upon an active component (e.g. a selective reduction catalyst (SCR) component), upon a reagent (e.g. urea to provide $NH_3$ to the SCR component), and/or upon a reagent delivery system (e.g. a reagent injector). Certain failures of these systems produce failures that are difficult to detect, and/or difficult to identify a source of the failure. For example, it is challenging to distinguish between a failed catalyst on the SCR component, a failed reagent (e.g. a urea reagent container erroneously or improperly filled with water), and a failed reagent delivery system.

Certain systems for aftertreatment rely upon having both upstream and downstream $NO_x$ measurement of the reduction catalyst to determine if the catalyst $NO_x$ conversion has degraded. Certain systems for aftertreatment rely upon inlet $NO_x$ determinations and reductant injection rate determinations that have high accuracy and precision to determine if the catalyst $NO_x$ conversion efficiency has degraded.

Therefore, further technological developments are desirable in this area.

SUMMARY

One embodiment is a unique method for determining a $NO_x$ reduction system failure. Other embodiments include unique methods and systems for distinguishing the failed component in the $NO_x$ reduction system. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
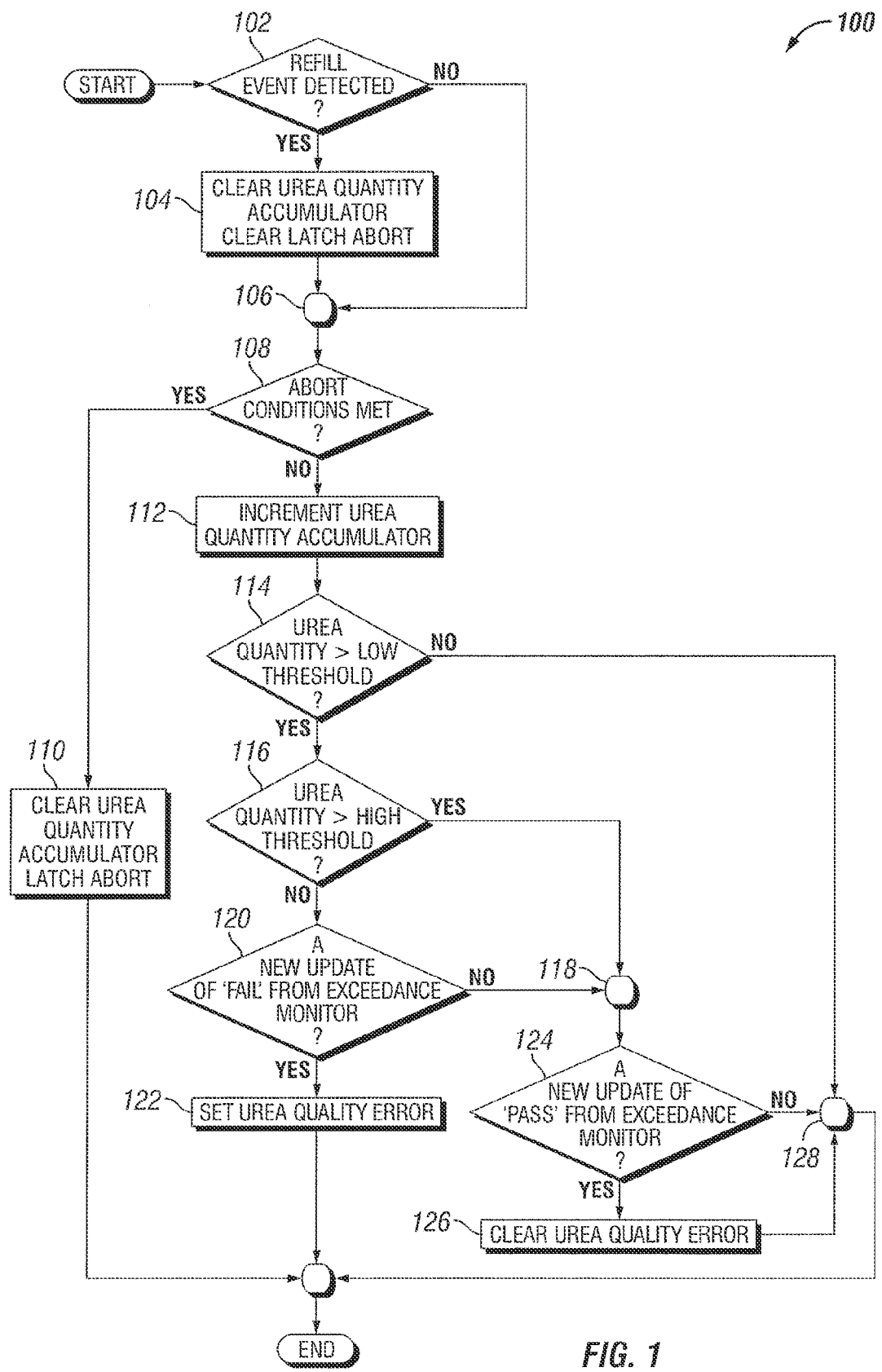
FIG. 1 is a schematic flow diagram of a procedure for detecting a reductant fluid quality error.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an example procedure 100 for performing a reductant fluid quality check is depicted. The procedure 100 includes an operation 102 to determine whether a refill event is detected. If the refill event is detected, at operation 104 a urea quality accumulator value is cleared (e.g. reset to zero) and a latching abort command is cleared, allowing the reductant fluid quality check to proceed. The latching abort command indicates that, once the abort command is set, the abort command value is held at the same value until updated by another operation.

In response to the refill event not being detected, the procedure 100 bypasses operation 104 to continuation 106, and the procedure further includes an operation 108 to determine whether abort conditions are met. In response to the abort conditions being met, the check includes an operation to clear the urea quantity accumulator, clear the latching abort command, and exit the check. Example operations to determine whether the abort conditions are met include checking the latching abort command, and checking whether a fault is present. Example faults that cause the reductant fluid quality check to abort include a temperature sensor fault, a $NO_x$ sensor fault, a reductant injector fault, and/or a reductant tank level fault. Additionally or alternatively, any fault in the system that renders an engine-out $NO_x$ estimate, a reduction catalyst $NO_x$ conversion efficiency estimate, and/or an injected amount of reductant (relative to a commanded amount of reductant) to be sufficiently uncertain is a fault that can be utilized to abort the reductant fluid quality check.

The reductant fluid quality check continues, when no abort condition is met, by an operation 112 to increment a urea quantity accumulator (or reductant quantity accumulator) according to an amount of urea being injected. The procedure 100 includes an operation 112 to compare the output of the urea quantity accumulator, the urea quantity, to a low test threshold, and if the urea quantity is less than the low test threshold the current execution cycle of the reductant fluid quality check is exited through continuation 128. If the urea quantity is greater than the low test threshold, the test is continued with an operation 116 to compare the urea quantity to a high test threshold.

In response to the urea quantity being greater than the high test threshold, the procedure 100 includes an operation 124 to determine whether the urea quality check can be determined to be a PASS value. The operation 124 is determined to be a PASS value when no $NO_x$ exceedance is observed. If the operation 124 is determined to be a PASS value, the procedure 100 includes an operation 126 to clear any urea quality error before proceeding to continuation 128 and exiting.

In response to the urea quantity being lower than the high test threshold, the procedure 100 includes an operation 120 to determine whether the check can be determined to be a FAIL value. If the check is determined to be a FAIL value, the procedure includes an operation 122 to set a urea quality error (or reductant fluid quality error), if present. An example operation 120 determines the check to be a FAIL value when a $NO_x$ exceedance is observed.

Figure 2A:
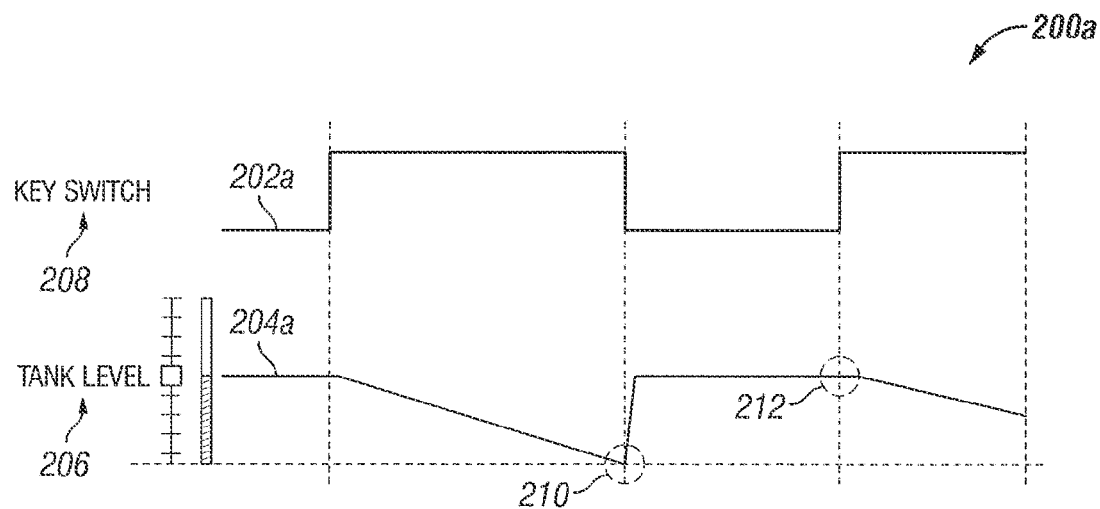
FIG. 2A illustrates an exemplary timeline for detecting a reductant fluid refill event.
Figure 2B:
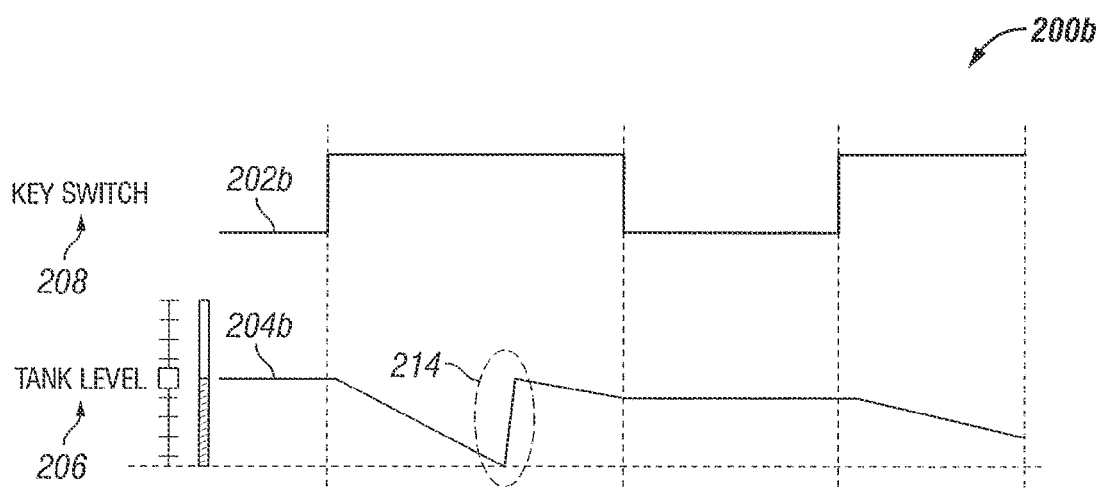
FIG. 2B illustrates a second exemplary timeline for detecting a reductant fluid refill event.

Referencing FIGS. 2A and 2B, illustrative data demonstrating an operation to detect a refill event is depicted. The curve 202a illustrate the state of the key switch 208, with a high vertical position indicating an "ON" key switch and a low vertical position indicating an "OFF" key switch. The curve 204a indicates the output of the urea tank level 206 (or reductant tank level), for example from a urea tank level sensor.

The exemplary operation includes a detection in response to a fill-up during a key off event (or other controller shutdown event wherein, during the period of the shutdown, a signal from a reductant tank level sensor is unavailable) illustrated in the top timeline. At a first time 210 the urea tank level is shown to be low at a time when a key switch is turned off. In the example of the upper timeline, the signal from the urea tank level is unavailable while the keyswitch remains off. The signal is resumed at a second time 212, and when the urea tank level is determined to be high, a refill event is detected.

The difference between the low and the high tank levels that is required to determine that a refill event has occurred may be any amount, including any minimally significant amount up to an amount requiring that the tank be substantially filled with new reductant fluid before a refill event is detected. For example, the refill event may detect top-off events where a minor but significant amount of urea is added, only events from a threshold low level to ensure that most of the present urea is newly added urea, or events where a specified percentage of the entire capacity of the urea tank is added (e.g. 10%, 20%, 50%, or other value). One of skill in the art will recognize that requiring more complete refills improves the reliability of a given reductant fluid quality check to properly determine the $NO_x$ reduction capacity of the replacement reductant fluid, but it will also reduce the number of opportunities to perform a reductant fluid quality check, as partial fill-ups of insufficient size to trigger a refill detection will extend the time period between checks.

Referencing FIG. 2B illustrative data demonstrates an operation to detect a refill event. In the operations of the lower timeline, while the key switch remains on and the urea tank level signal remains active, a fill up event occurs at the time period 214. In certain embodiments, when a urea tank level increase is detected, an initial urea tank level and a final urea tank level are determined according to when the tank level rise begins and ends, and/or according to when the tank level rise begins and a tank level decrease begins. According to the difference between the final and initial urea tank levels, a refill event may be detected. The amount of rise determined to be a refill event is determined under similar considerations for an embodiment utilizing FIG. 2B or FIG. 2A.

Figure 3:
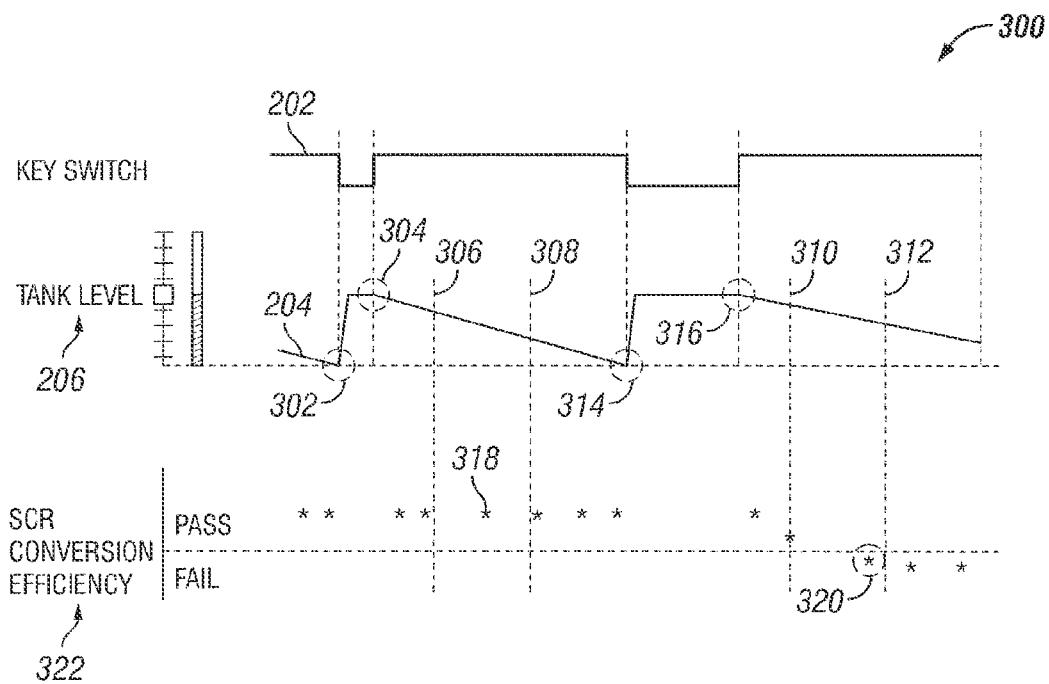
FIG. 3 illustrates a timeline for detecting a reductant fluid quality error.

Referencing FIG. 3, example operations of a reductant fluid quality check procedure are shown on a timeline of illustrative data 300. The upper data timeline indicates the "DEF" tank level (diesel exhaust fluid), which may be a level of any reductant fluid. The lower timeline indicates an asterisk 318, 320 at each reductant fluid quality check result. Certain ones of the reductant fluid quality check results are utilized, and certain others of the reductant fluid quality check result are ignored. At the bounded times 302, 304 in the upper timeline, a refill event is detected due to the rise in the DEF tank level.

Referencing the lower timeline, test data points occurring before the DEF tank refill event are ignored and the test results are not used to set or clear a reductant fluid quality error. After the DEF tank refill event, the test data points are likewise ignored until an amount of reductant is injected that exceeds the low test threshold—occurring at time 306 in the illustration. The test continues until the high test threshold amount of reductant is injected, occurring at time 308 in the illustration. The test point 318 that occurs between the times 306, 308 is utilized, and since a sufficient SCR conversion efficiency 322 is demonstrated reductant fluid quality error is cleared, reset, decremented, or other actions are taken consistent with a passed check on the $NO_x$ reduction system. In the example embodiment, test values occurring later than the high test threshold may be ignored, or may be utilized to clear or decrement a reductant fluid quality error. In one form, test values occurring later than the high test threshold are not utilized to increment or set the reductant fluid quality error.

Further in FIG. 3, a second DEF tank refill event occurs between times 314, 316. The low test threshold amount of urea injected is passed at time 310 in the example, and the high test threshold amount of urea injected is passed at time 312 in the example. A test value 320 indicates that a $NO_x$ exceedance event occurred. The test value 320 occurs before the high test threshold is reached, and a reductant fluid quality error is set or incremented, or other actions are taken consistent with a failed check on the $NO_x$ reduction system. In the example of FIG. 3, the two test values occurring after the high test threshold is reached are not utilized.

An example procedure for determining whether an aftertreatment $deNO_x$ system failure is present and for determining the source of the $deNO_x$ system failure is described following. The example procedure for determining the $deNO_x$ system failure and source may be combined with other procedures to eliminate potential causes for system failure and/or performance degradation.

The exemplary procedure includes determining a deNO$_x$ efficiency within a temperature and exhaust flow range where the deNO$_x$ efficiency has a reduced sensitivity to variation and uncertainty in the sensing values. The procedure includes determining a normalized deNO$_x$ efficiency, which includes a ratio between measured deNO$_x$ efficiency and expected deNO$_x$ efficiency, such as shown in Equation 1. The normalized deNO$_x$ efficiency is calculated for the data points with an ammonia to NO$_x$ ratio (ANR) higher than a stoichiometric ANR ($\beta$).

$$\eta_{Normalized} = \frac{\eta_{measured}}{\eta_{nominal}} = \frac{(NO_{x\_in} - NO_{x\_out})/NO_{x\_in}}{\eta_{nominal}} \quad \text{(Equation 1)}$$

It has been found that at ANR values above the $\beta$ value, the deNO$_x$ efficiency is not sensitive to ANR, which reduces the noise introduced from NO$_x$ reduction catalyst inlet NO$_x$ sensing error (or modeled inlet NO$_x$ error) and urea dosing error. Accordingly, the normalized deNO$_x$ efficiency can be more indicative of the effects of the NO$_x$ reduction catalyst and the reductant fluid quality, while helping decouple the effects of inlet NO$_x$ determination errors and reductant injection rate errors. Referencing FIG. 4, simulated illustrative data is shown illustrating the deNO$_x$ efficiency behavior of various operating curves. The curves 416, 418, 420, and 424 illustrate example deNO$_x$ efficiency values as a function of the ANR, and illustrate that the deNO$_x$ efficiency rises linearly with the ANR over a period of operating points below the $\beta$ value, begins a non-linear transition region around the $\beta$ value, at flattens at high ANR values to a value which is not responsive to the ANR at high ANR values. The values 422 represent a number of possible curves that may be determined for a given system, similar to the curves 416, 418, etc.

Figure 4:
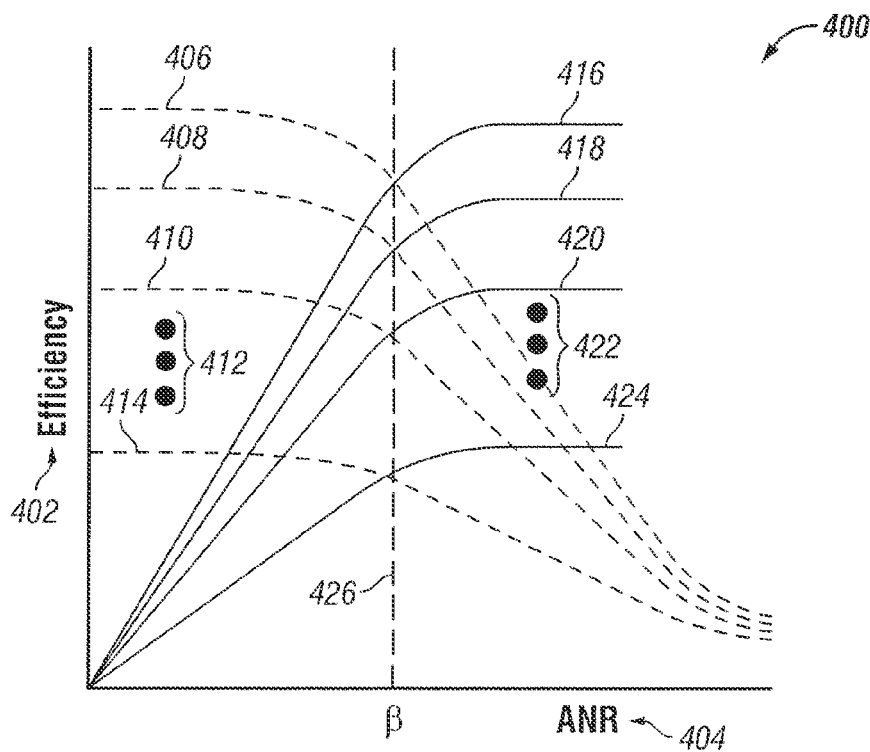
FIG. 4 illustrates exemplary $deNO_x$ efficiency and $deNH_3$ efficiency values plotted against ANR for a $NO_x$ reduction system.

Referencing again FIG. 4, the curves 406, 408, 410, 414 illustrate example deNH$_3$ efficiency curves corresponding to the deNO$_x$ efficiency curves 416, 418, 420, 424. The curves for deNO$_x$ efficiency and deNH$_3$ efficiency meet at the $\beta$ value, or at the stoichiometric point. The values 412 represent a number of possible curves that may be determined for a given system, similar to the curves 406, 408, etc. The curves 406, 408, 410, 414 are illustrated to provide a fuller understanding of the catalyst activity in the system.

For the data points with ANR less than $\beta$, the procedure includes determining an $\epsilon$ value. The $\epsilon$ value is defined as the ratio between dosing commands and NO$_x$ removed in the catalyst (see Equation 2). In the example of Equation 2, the $\epsilon$ value is a mass balance ratio. For example, as depicted in the illustrative data of FIG. 5, while the deNO$_x$ efficiency is insensitive to ANR at high ANR values—specifically above $\beta$—the $\epsilon$ value becomes relatively insensitive to ANR at low values of ANR. The curves 504 depicts the $\epsilon$ value as a function of ANR. As depicted in the illustrative data of FIG. 4, the $\epsilon$ value becomes relatively insensitive to ANR at low values of ANR, specifically below $\beta$.

$$\varepsilon = \frac{NH_3\_in}{NO_x\_in - NO_x\_out} = \frac{NH_3\_in/NO_x\_in}{(NO_x\_in - NO_x\_out)/NO_x\_in} = \frac{ANR}{DeNOx\_eff} \quad \text{(Equation 2)}$$

When evaluated in the regions where it is insensitive to ANR, the normalized deNO$_x$ efficiency is more sensitive to catalyst deNO$_x$ efficiency deterioration, and decouples engine-out NOx determinations and urea injector errors. Generally, a deteriorated deNOx efficiency will move downward in the curves, for example from operating curve 416 to operating curve 418. When evaluated in the regions where it is insensitive to ANR, the $\epsilon$ value is more sensitive to urea delivery, and decouples catalyst deNO$_x$ efficiency deterioration.

Figures 5, 6:
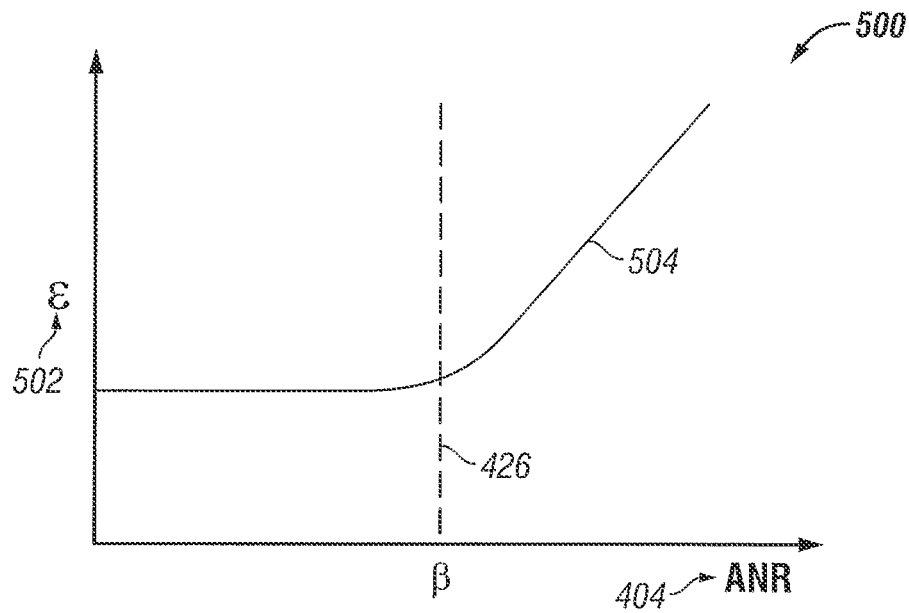
FIG. 5 illustrates an epsilon ($\epsilon$) value plotted against ANR for a $NO_x$ reduction system.
FIG. 6 depicts an exemplary behavior table for a $NO_x$ reduction system diagnostic procedure.

Referencing FIG. 6, an example logic description to utilize the normalized deNO$_x$ efficiency and the $\epsilon$ value is illustrated. In the example of FIG. 6, where both the deNO$_x$ efficiency and the $\epsilon$ value indicate a component failure, the failure is attributable to any of the deNO$_x$ catalyst, the reductant dosing system, or the reductant fluid quality. Where both of the deNO$_x$ efficiency and the $\epsilon$ value indicate a PASS, then no component failure is indicated. Where the $\epsilon$ value indicates a component failure and the deNO$_x$ efficiency indicates a PASS, the component failure is narrowed to the reductant dosing system or the reductant fluid quality. Where the $\epsilon$ value indicates a PASS and the deNO$_x$ efficiency indicates a component failure, the component failure is narrowed to the deNO$_x$ catalyst or the reductant fluid quality.

Referencing FIG. 6, an illustrative component failure logic 600 is depicted. The component failure logic 600 is helpful to reduce maintenance costs and failure diagnostic time, as well as to separate coupled issues in diagnosing a failed component. Alternatively or additionally, the information from FIG. 6 can be utilized with other information available in the system to further determine which component is failed. For example, if a catalyst temperature excursion is observed immediately before a failure, it may be determined to be more likely to be a failed catalyst than a reductant fluid quality failure. A technician may manually check a reductant fluid quality or a reductant doser system. In one form, a fault present in the reductant doser system, a reductant tank level that is observed to drop as expected over time, results from an active diagnostic performed on the reducant dosing system, and/or any other information available in the system may be utilized with the information from FIG. 6 to determine which component of a NO$_x$ reduction aftertreatment system has failed.

In the example component failure logic 600 of FIG. 6, a first column 602 depicts an $\epsilon$ based failure determination, for example according to Equation 2 and the nominal operations depicted in FIG. 5 or similar information calibrated for a particular system. A second column 604 depicts a normalized deNO$_x$ efficiency based failure determination, for example according to Equation 1 and the deNO$_x$ efficiency curves depicted in FIG. 4 or similar information calibrated for a particular system. In the example logic 600, where the $\epsilon$ indicates a failure and the normalized deNO$_x$ efficiency indicates a failure, the failure is determined to be one of the catalyst, the dosing injector, or the reductant quality, although the diagnostic differences of the $\epsilon$ and normalized deNO$_x$ efficiency do not separate these component failures. Where the $\epsilon$ indicates a failure, but the normalized deNO$_x$ efficiency does not indicate a failure, the catalyst is understood to be working properly and the component failure is narrowed to a dosing injector or the reductant quality. Where the $\epsilon$ indicates a pass and the normalized deNO$_x$ efficiency indicates a failure, the component failure is understood to be either the catalyst or the reductant quality. Where both the $\epsilon$ and the normalized deNO$_x$ efficiency indicate a pass, the system is understood to be working correctly. The output of the logic 600 can be combined with other information, for example a reductant quality check such as depicted in FIG. 1, to further narrow the diagnosis of any failure.

Another example procedure is described for diagnosing whether reductant fluid is proper, diluted, replaced, or otherwise improper. The procedure includes an operation to determine whether a tank refill event is detected. An example operation includes interpreting a reductant tank level value, for example from a tank level sensor, and in response to the reductant tank level value determining the reductant tank is recently filled. The procedure further includes determining a tank refill event in response to the reductant tank level value. In response to the tank refill event, the procedure includes an operation to clear a reductant accumulator value and proceeding with a reductant fluid quality check. The operation also clears an abort latch, such that a check at operation will indicate that abort conditions are not met for the purpose of checking a new urea tank, although other abort conditions may be otherwise met.

The procedure further includes determining a $NO_x$ emissions amount, for example determined from reductant dosing commands, inlet and outlet $NO_x$ levels for a reductant catalyst, an estimated temperature for the reductant catalyst, and an exhaust flow rate for an engine providing the exhaust treated by the reductant catalyst. The inlet and outlet $NO_x$ level values may be determined from a sensor, and the inlet $NO_x$ level may alternatively or additionally be determined from a model. The reductant catalyst temperature may be determined from an inlet sensor, outlet sensor, a mid-brick sensor, and/or from a weighted average of available sensors or a modeled value based upon exhaust and/or turbine outlet temperatures.

The exemplary procedure further includes determining a $NO_x$ exceedance event in response to the $NO_x$ emissions amount. In response to the $NO_x$ exceedance event occurring within a predetermined period after the tank refill event, a reductant fluid quality failure is detected. In certain embodiments, determining the $NO_x$ exceedance event includes accumulating a reductant injected amount during a period of the reductant fluid quality check. In response to the reductant injected amount being lower than a low test threshold, the reductant fluid quality check is exited without conclusion. In response to the reductant injected amount being greater than a high test threshold, the procedure includes an operation to clear any reductant fluid quality error if a $NO_x$ exceedance is not detected. In response to the reductant injected amount being greater than the low test threshold but less than the high test threshold, the procedure includes an operation to set a reductant fluid quality error if a $NO_x$ exceedance is detected, and to clear a reductant fluid quality error if the $NO_x$ exceedance is not detected.

The detection of the $NO_x$ exceedance includes determining that a threshold amount of $NO_x$ is being emitted from the system, where the threshold amount of $NO_x$ is a selected amount of $NO_x$. Exemplary and non-limiting threshold amounts of $NO_x$ include an amount exceeding an emissions target, an amount exceeding a short-term emissions target, an amount exceeding any other $NO_x$ target value, and/or an amount exceeding any selected target with an added or subtracted estimated margin of error. The margin of error may be added, for example, to ensure that a given $NO_x$ emissions level is actually greater than the $NO_x$ target value. The margin of error may be subtracted, for example, to ensure that a given $NO_x$ emissions level does not exceed the $NO_x$ target value before a reductant fluid quality error is set. The margin of error is a value that may be updated over time, for example to the uncertainty of a $NO_x$ estimate at current operating conditions of the system.

Figure 7:
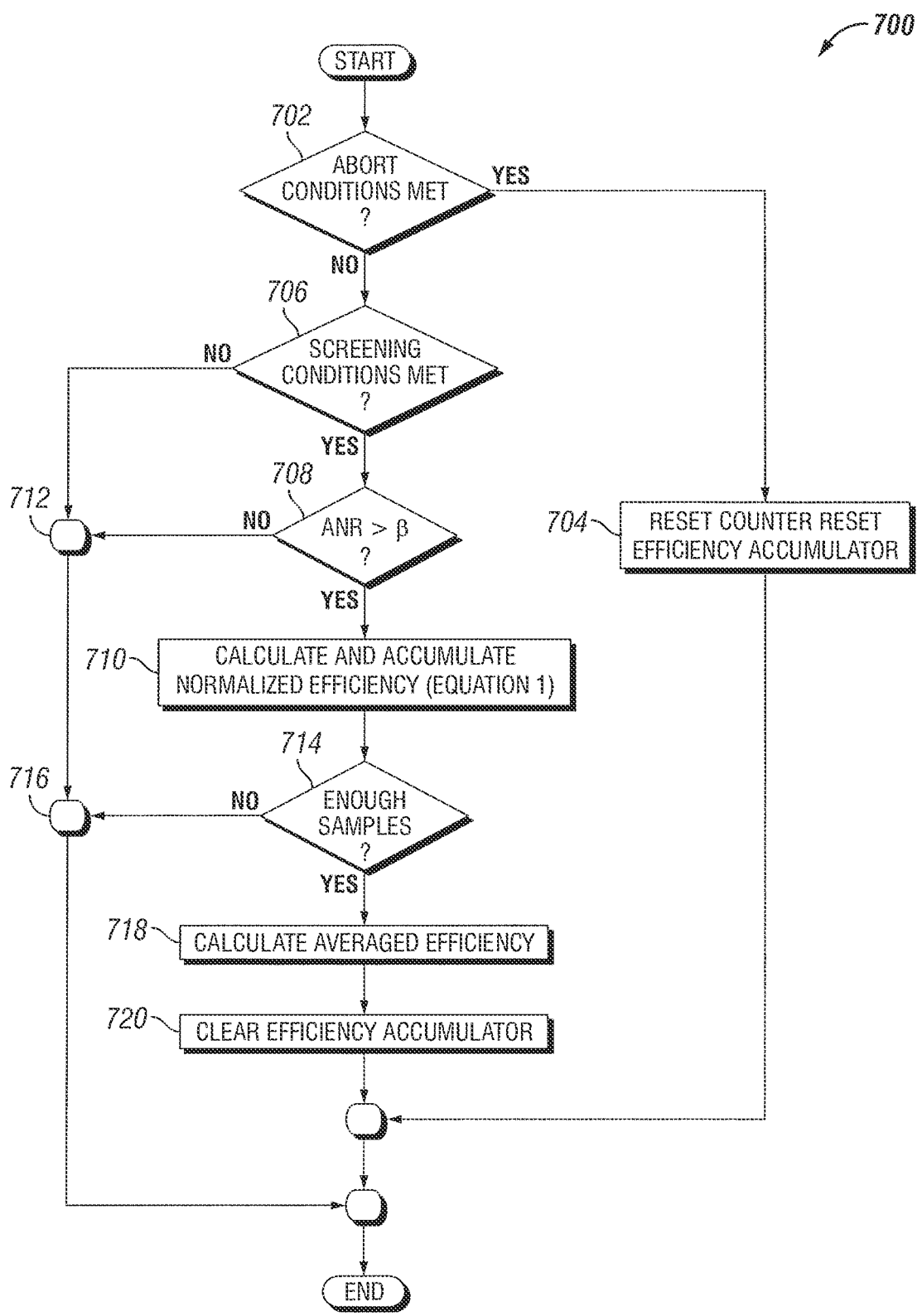
FIG. 7 is a schematic flow diagram of a procedure for determining an average $deNO_x$ efficiency.

Referencing FIG. 7, an example procedure 700 for monitoring an aftertreatment system is illustrated. The procedure 700 includes an operation 702 to check whether abort conditions for the procedure are met. Exemplary abort conditions include a fault in a hardware component and/or sensor related to the aftertreatment system, a transient operating condition being present, and a reductant dosing system that is presently available to dose (e.g. no conditions are present that prevent the dosing system from providing reductant during the monitoring procedure). The transient operating condition can be a transient exhaust temperature, exhaust flow, and/or engine-out $NO_x$ level value. In certain embodiments, the presence of steady state operating conditions, or the lack of transient operating conditions, allows the monitoring procedure to proceed. Where abort conditions are present, the procedure includes an operation 704 to reset a counter (a samples taken counter) and an efficiency accumulator.

The procedure 700 further includes an operation 706 to determine whether screening conditions are present. Example screening conditions include determining that an SCR catalyst temperature is within an operating range, determining that an exhaust flow value or a catalyst space velocity is in an operating range, determining that a dosing command is not presently restricted or limited, and/or that a $NO_x$ sensor output is operating within a high confidence regime. Example conditions for the $NO_x$ sensor output to operate in a high confidence regime include the NOx sensor output value being within a rational range, the NOx sensor value being lower than a threshold value (e.g. not near the top of the operating range such that it might become unreliable during the test), that ambient air pressure is within a normal range, that an $NH_3$ slip estimate is within a normal range, and/or that an $NO_2$ slip estimate is within a normal range. In certain embodiments, some test screening or testing abort conditions may be characterized as an abort condition or a screening condition. Generally, where a condition should be absent it is characterized as an abort condition for the test to proceed, and where a condition should be present it is characterized as a screening condition for the test to proceed, but such characterizations are not limiting to any particular embodiment, and certain conditions may be an abort condition in certain embodiments and a screening condition in certain embodiments.

The procedure 700 includes an operation 708 to determine whether the present ANR is greater than the β value. The β value is a stoichiometric value of ANR, or a value near stoichiometric wherein the variability in the $deNO_x$ efficiency as a function of the ANR is acceptably low. Where the ANR is below the β value, the procedure 700 exits the current execution cycle through continuations 712, 716. Where the ANR is above the β value, the procedure 700 continues with an operation 710 to calculate and accumulate a normalized efficiency value, for example as in Equation 1. The operation 700 to accumulate the normalized efficiency value includes any operation enabling the averaging of a number of normalized efficiency values, including storing a number of efficiency values in a memory buffer, utilizing a filtered or weighted averaged efficiency value that captures historical efficiency value information over a number of efficiency value points, and similar operations understood in the art.

The procedure 700 further includes an operation 714 to determine whether a sufficient number of efficiency value samples have been taken. The operation 714 to determine whether a sufficient number of samples have been taken includes determining whether a predetermined number of samples have been taken, determining whether enough samples have been taken to provide a given statistical confidence in the average of the samples, and/or may further include weighting of the confidence increment provided by each of the samples in response to the particular reliability of a given sample and determining whether the accumulated confidence exceeds a threshold value.

Where the procedure 700 has not resulted in a sufficient number of samples, the procedure 700 exits the current execution cycle through the continuation 716. Where the procedure 700 has provided sufficient samples, the procedure 700 includes an operation 718 to calculate an averaged efficiency. The operation 718 to calculate the averaged efficiency includes an operation to determine a statistically significant average—for example a mean or median average, an operation to utilize a moving average as the average, and/or an operation to utilize a filtered value as an average. Any other averaging operations understood in the art are contemplated herein. The procedure includes an operation 720 to clear the efficiency accumulator, which may further include resetting any filters, moving averages, or other information history parameters.

Figure 8:
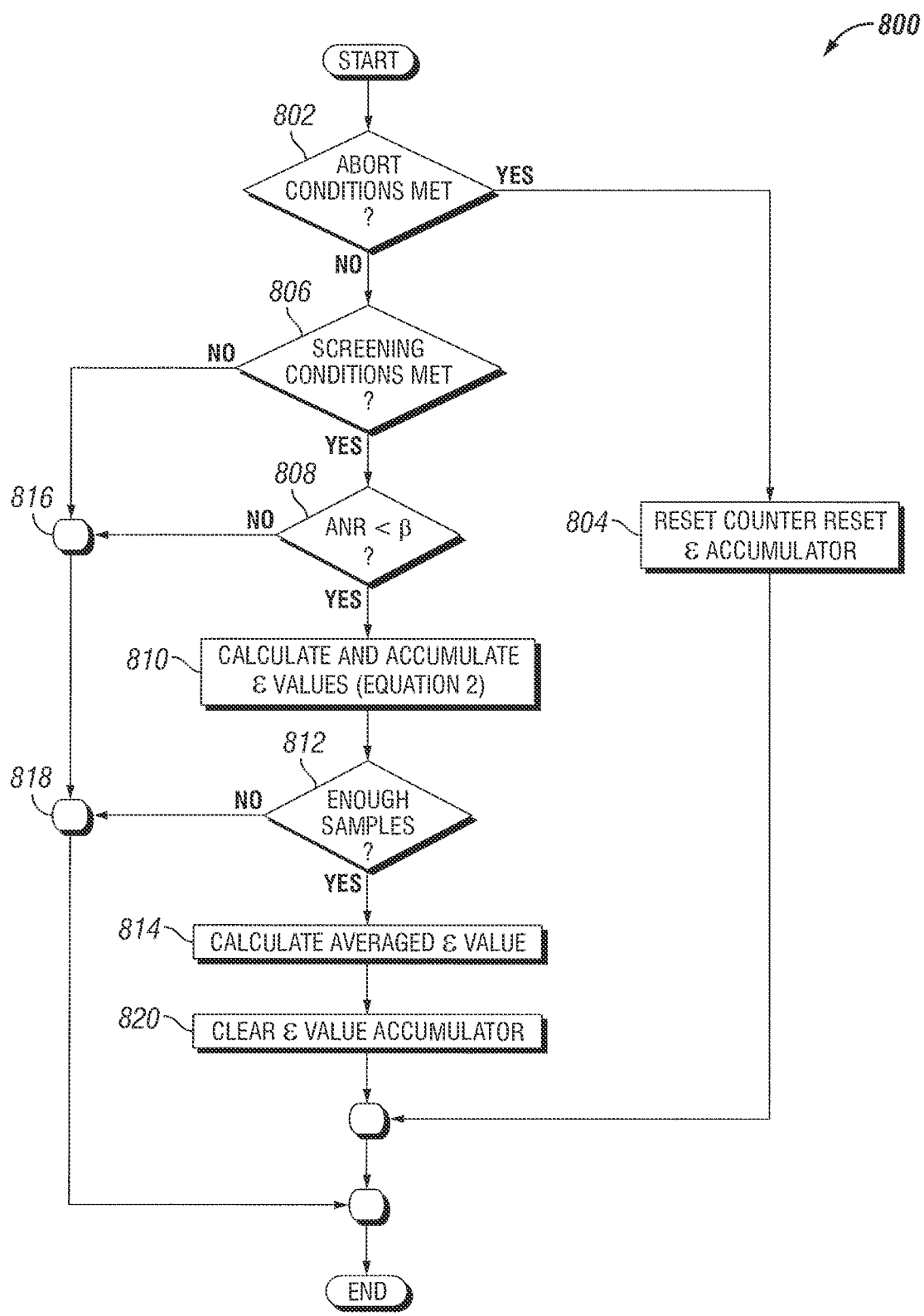
FIG. 8 is a schematic flow diagram of a procedure for determining an averaged $\epsilon$ value.

Referencing FIG. 8, an exemplary procedure 800 for monitoring an aftertreatment system is illustrated. The procedure 800 includes an operation 802 to check whether abort conditions for the procedure are met. Exemplary abort conditions include a fault in a hardware component and/or sensor related to the aftertreatment system, a transient operating condition being present, and a reductant dosing system that is presently available to dose (e.g. no conditions are present that prevent the dosing system from providing reductant during the monitoring procedure). The transient operating condition can be a transient exhaust temperature, exhaust flow, and/or engine-out $NO_x$ level value. In certain embodiments, the presence of steady state operating conditions, or the lack of transient operating conditions, allows the monitoring procedure to proceed. Where abort conditions are present, the procedure includes an operation to reset a counter (a samples taken counter) and an $\epsilon$ accumulator.

The procedure 800 further includes an operation 806 to determine whether screening conditions are met. The abort conditions and screening conditions of the procedure 800 are similar to but need not be the same as the abort conditions and screening conditions of the procedure 700. For example, procedure 800 utilizes values of ANR below $\beta$, and determines values of $\epsilon$ rather than normalized $deNO_x$ efficiency. The criteria, operating ranges of sensors, and operating margin within the operating range of sensors and hardware components, to determine whether $\epsilon$ can be reliably determined and an $\epsilon$-based test successfully completed can differ from the same parameters for a $deNO_x$ efficiency based test.

The procedure 800 includes an operation 808 to determine whether the present ANR is less than the $\beta$ value. The $\beta$ value is a stoichiometric value of ANR, or a value near stoichiometric wherein below the $\beta$ value the variability in the $\epsilon$ as a function of the ANR is acceptably low. Where the ANR is above the $\beta$ value, the procedure exits the current execution cycle through the continuations 816, 818. Where the ANR is below the $\beta$ value, the procedure 800 continues with an operation 810 to calculate and accumulate an $\epsilon$ value, for example as in Equation 2. The operation 810 to accumulate the $\epsilon$ value includes any operation enabling the averaging of a number of $\epsilon$ values, including storing a number of $\epsilon$ values in a memory buffer, utilizing a filtered or weighted averaged $\epsilon$ value that captures historical $\epsilon$ value information over a number of $\epsilon$ value points, and similar operations understood in the art.

The procedure 800 further includes an operation 812 to determine whether a sufficient number of $\epsilon$ value samples have been taken. The operation to determine whether a sufficient number of samples have been taken includes determining whether a predetermined number of samples have been taken, determining whether enough samples have been taken to provide a given statistical confidence in the average of the samples, and/or may further include weighting of the confidence increment provided by each of the samples in response to the particular reliability of a given sample.

Where the procedure 800 has not resulted in a sufficient number of samples, the procedure exits the current execution cycle. Where the procedure 800 has provided sufficient samples, the procedure 800 includes an operation 814 to calculate an averaged $\epsilon$ value. The operation 814 to calculate the averaged $\epsilon$ value includes an operation to determine a statistically significant average—for example a mean or median average, an operation to utilize a moving average as the average, and/or an operation to utilize a filtered value as an average. Any other averaging operations understood in the art are contemplated herein. The procedure includes an operation 820 to clear the $\epsilon$ accumulator, which may further include resetting any filters, moving averages, or other information history parameters.

Another exemplary set of embodiments includes a procedure for monitoring a $NO_x$ reduction catalyst conversion capability. In certain embodiments, the procedure is operable with a $NO_x$ sensor downstream of the $NO_x$ reduction catalyst, and no $NO_x$ sensor upstream of the $NO_x$ reductions catalyst. The procedure may be useful in a system having an upstream $NO_x$ sensor, for example as a backup diagnostic for the $NO_x$ reduction catalyst if the upstream $NO_x$ sensor is failed or suspect. The procedure includes an operation to determine an expected $NO_x$ emissions value—the $NO_x$ emissions value being a $NO_x$ emissions value downstream of the $NO_x$ reduction catalyst (e.g. "tailpipe" $NO_x$). An exemplary expected $NO_x$ emissions value is described with reference to FIGS. 10 and 11 following, wherein the diagonal line 1010, 1110 is utilized as the expected $NO_x$ emissions value.

Figure 10:
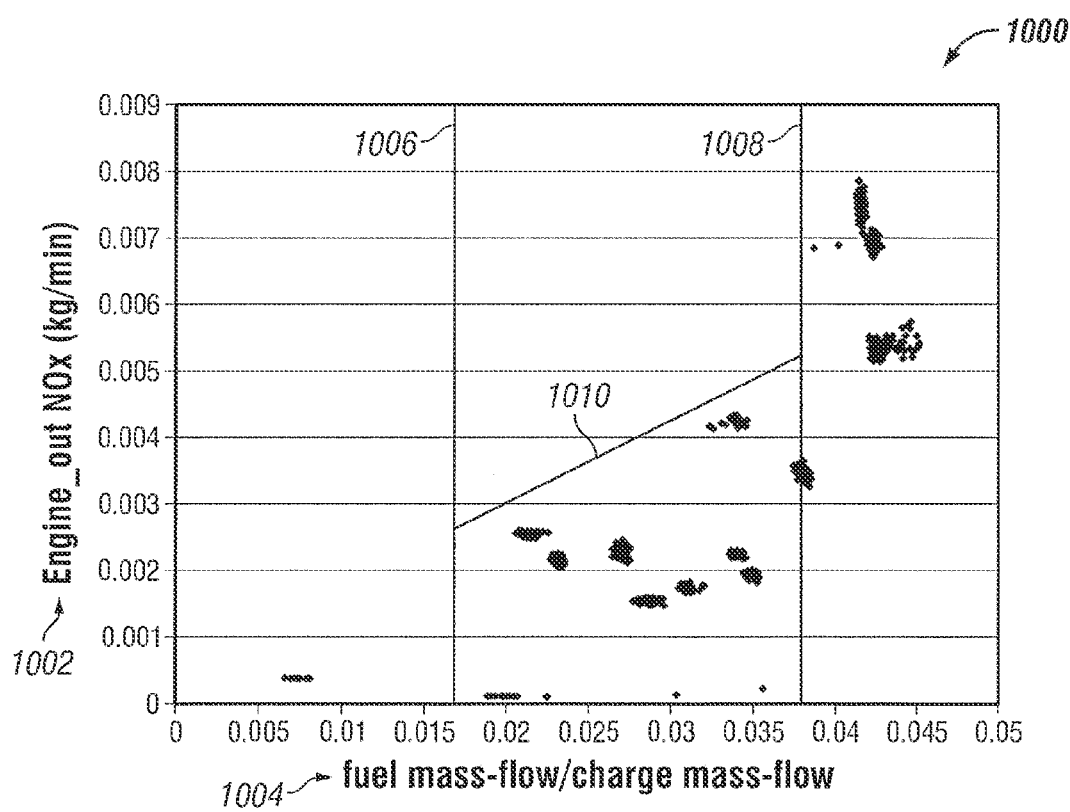
FIG. 10 provides an illustrative estimated $NO_x$, high $NO_x$ threshold, and low $NO_x$ threshold value.
Figure 11:
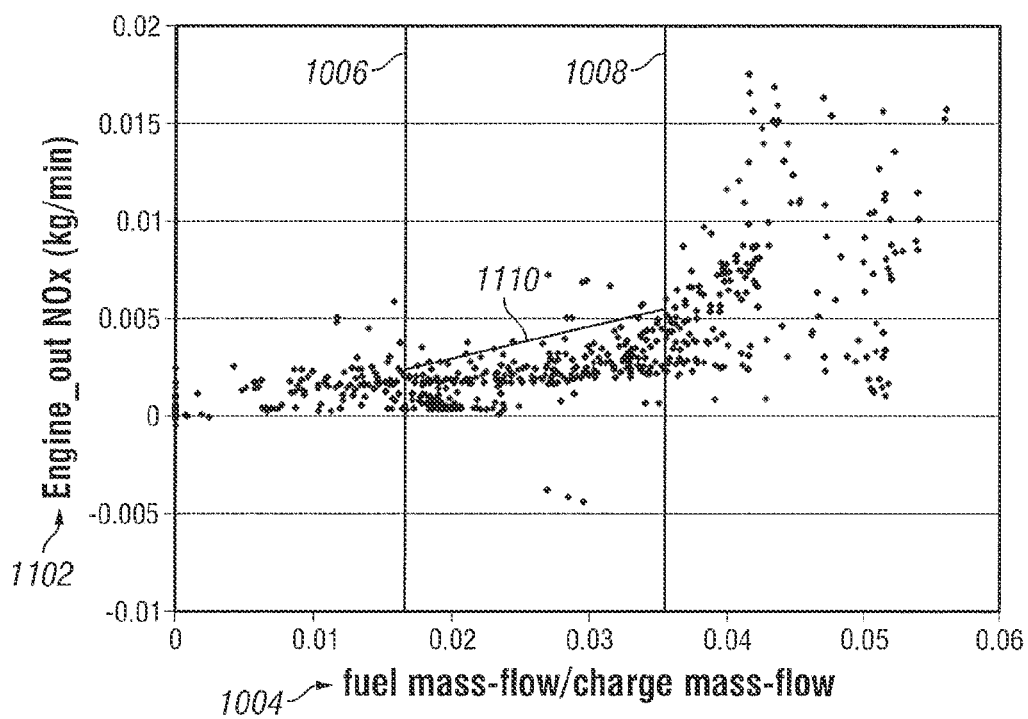
FIG. 11 provides an illustrative estimated $NO_x$, high $NO_x$ threshold, and low $NO_x$ threshold value, with a $NO_x$ value plotted on a logarithmic axis.

The procedure further includes determining that a present engine out $NO_x$ amount is lower than a $NO_x$ catalyst threshold capability value and greater than a failed $NO_x$ catalyst threshold capability value. The $NO_x$ catalyst threshold capability value is a $NO_x$ amount where a fully capable $NO_x$ catalyst experiences a decreasing $NO_x$ conversion capability due to high quantity of $NO_x$ passing through the catalyst. The failed $NO_x$ catalyst threshold capability value is a $NO_x$ amount where a severely degraded $NO_x$ catalyst will nevertheless exhibit a very high $NO_x$ conversion due to the low quantity of $NO_x$ passing through the catalyst. Additionally or alternatively, the high and low $NO_x$ threshold values are further bounded by a region wherein a $NO_x$ model is determined to be reliable. Exemplary high and low $NO_x$ threshold values are described with reference to FIGS. 10 and 11 following. FIG. 10 depicts test cell data 1000 taken for a particular system run through a predetermined load schedule, and FIG. 11 depicts test cell data 1100 for a similar system run through a different predetermined load schedule. The data includes the engine out $NO_x$ output 1002, 1102 as a function of the fuel mass over charge mass 1004. The left vertical line 1006 is selected according to the low $NO_x$ threshold value, and the right vertical line 1008 is selected according to the high $NO_x$ threshold value. The example thresholds 1006, 1008 are non-limiting.

The procedure includes determining the present engine out $NO_x$ amount in response to engine fueling, engine torque, and/or a present engine speed. Additionally or alternatively, the procedure includes determining the present engine out $NO_x$ amount in response to an intake manifold pressure and one or more timing values of injected fuel (or spark timing for a spark-ignition engine). Any engine out $NO_x$ model understood in the art is contemplated herein.

In one example, the low $NO_x$ value 1006 (e.g. the failed $NO_x$ catalyst threshold capability value) is determined at a low value of a fuel mass-flow to charge mass-flow ratio, and the high $NO_x$ value 1008 (e.g. the $NO_x$ catalyst threshold capability value) is determined at a high value of the fuel mass-flow to charge mass-flow ratio. When the observed fuel mass-flow to charge mass-flow ratio is between the low value and the high value, the procedure to monitor the $NO_x$ reduction catalyst proceeds. In a further embodiment, an estimated $NO_x$ value for the engine is determined from a calibration line 1010, 1110 between the low value and the high value that bounds an observed engine out $NO_x$ amount, or that bounds a majority of observed engine out $NO_x$ amount data points.

Referencing FIG. 10, a plot 1000 of engine-out $NO_x$ amounts as a function of fuel mass-flow to charge mass-flow ratios are illustrated. The data points in FIG. 10 are taken from a test cell for a particular engine, and are representative of the type of data that an operator can readily determine for a given system. In the embodiment of FIG. 10, the left vertical line 1006 is taken as the low value of a fuel mass-flow to charge mass-flow ratio, and the right vertical line 1008 is taken as the high value of a fuel mass-flow to charge mass-flow ratio. The low and high values may be determined according to the quality of the model, for example selecting logical bounding points for reliable data, and/or according to the engine-out $NO_x$ amounts that are treatable by a properly functioning $NO_x$ reduction catalyst (for the high value) and the engine-out $NO_x$ amounts that would be treatable even for a failed or degraded $NO_x$ reduction catalyst (for the low value). The diagonal line 1010 between the high and low values, in one form, is the engine-out $NO_x$ amount estimate to be utilized in a procedure such as the procedure described in the section referencing FIG. 9.

The procedure further includes an operation to perform a screening step, wherein a number of screening parameters are checked, and the operation to monitor the $NO_x$ reduction catalyst $NO_x$ conversion capability is continued if the screening parameters pass. Exemplary and non-limiting screening parameters include the $NO_x$ reduction catalyst within a proper operational temperature, an exhaust flow of the engine being within a specified range, a rate of change of the $NO_x$ reduction catalyst temperature being lower than a threshold value, a reductant injection command value not being limited by a system constraint (i.e. the control system for the reductant injection determination is commanding a reductant injection amount that is estimated to be sufficient to convert a designed amount of $NO_x$), the downstream $NO_x$ sensor value is reading within a specified range and does not have a fault, the rate of change of the $NO_x$ sensor value is below a threshold value, an ambient pressure is within a specified range, an estimated $NH_3$ slip amount is within a range or below a threshold, and an estimated $NO_2$ slip amount is within a range or below a threshold value. Additional screening parameters include a determination that the engine is at steady state operation, that an engine speed rate of change is below a threshold value, and/or that an engine fueling or torque value rate of change is below a threshold value.

The determination of ranges for each screening parameter depends upon the hardware present in the system, the $NO_x$ amount that is considered for the system (e.g. due to relevant emissions limits, etc.), and is a mechanical step for one of skill in the art having the benefit of the disclosures herein. Each range and limit for the screening parameters is selected to ensure that the $NO_x$ reduction catalyst is operating under nominal conditions wherein a properly operating catalyst should be expected to succeed and a sufficiently degraded or failed catalyst should be expected to provide insufficient $NO_x$ reduction.

An exemplary procedure includes determining an averaged expected $NO_x$ value and an averaged measured $NO_x$ value from the $NO_x$ sensor downstream of the $NO_x$ reduction catalyst, and determining whether the $NO_x$ reduction capability is failed in response to the averaged measured $NO_x$ values. The averaged $NO_x$ values may be averages of a number of values stored in a buffer, a filtered value of each parameter (with the same or distinct time constants), moving averages of the $NO_x$ values, or values determined from other averaging mechanisms known in the art. The threshold to determine a failed $NO_x$ conversion capability is selectable according to the specific parameters of the contemplated system, and may be a difference of 20%, 30%, 50%, or greater $NO_x$ amounts. In certain embodiments, the difference may be a ratio difference of observed:expected $NO_x$ (e.g. 1.2:1), an absolute value of $NO_x$ (e.g. 10 g/hr), and/or a difference in selected units (e.g. 0.5 g/hp-hr difference).

Figure 12:
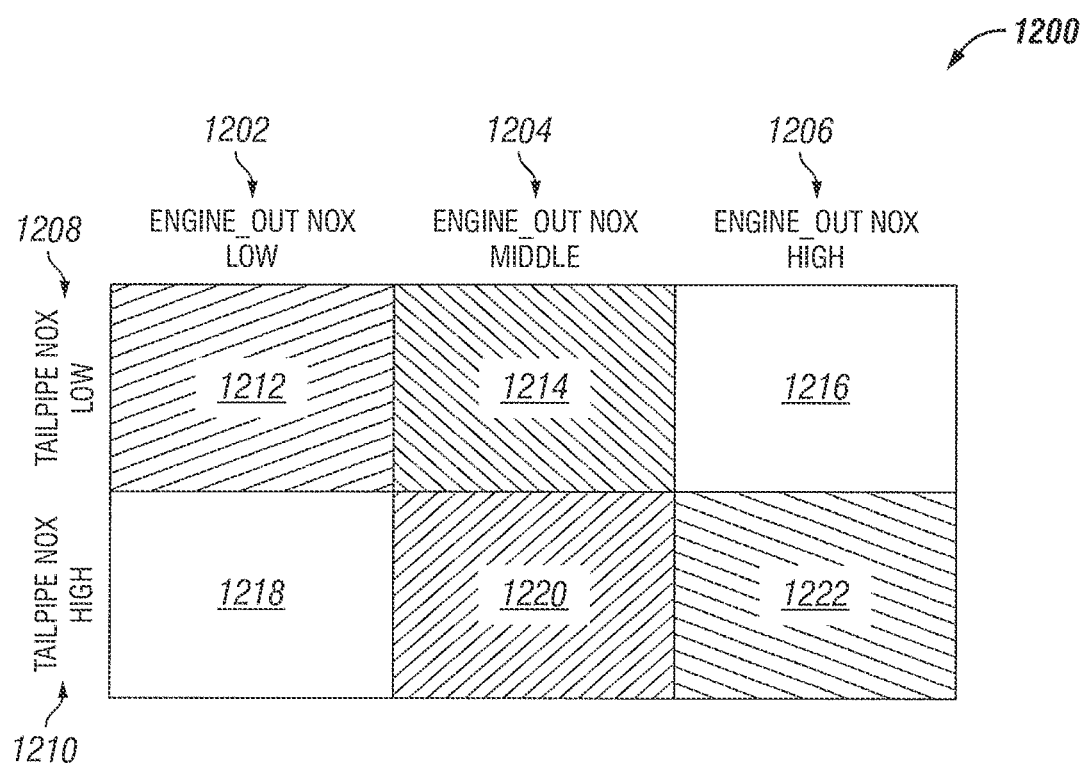
FIG. 12 depicts an exemplary behavior table for a $NO_x$ reduction system monitoring procedure.

Another exemplary procedure includes determining whether an engine-out $NO_x$ regime is in a low, nominal, or high output region. For example, referencing FIG. 10, the low region may be left of the left vertical line 1006, the nominal region may be between the vertical lines 1006, 1008, and the high region may be to the right of the right vertical line 1008. The exemplary procedure further includes determining whether the observed $NO_x$ amount is higher or lower than the expected $NO_x$ amount. Referencing FIG. 12, an exemplary response table 1200 is illustrated for the exemplary procedure.

In response to the observed tailpipe $NO_x$ amount being lower 1208 than the expected $NO_x$ amount, in the low engine-out $NO_x$ regime 1202 the procedure in region 1212 includes blocking the monitor from passing the $NO_x$ reduction capability, or blocks the monitor from clearing a $NO_x$ reduction capability fault. In the region 1212, an example procedure in certain embodiments does not determine the $NO_x$ reduction capability is failed. In response to the observed tailpipe $NO_x$ amount being lower 1208 than the expected $NO_x$ amount, in the nominal engine-out $NO_x$ regime 1204, the procedure in region 1214 determines the $NO_x$ reduction capability is passed or allows the monitor to clear a $NO_x$ reduction capability fault. In response observed tailpipe $NO_x$ amount being lower 1208 than the expected NOx amount, in the high engine out $NO_x$ region 1206, the example procedure in the region 1216 determines the $NO_x$ sensor to be in error or to fail a sensor rationality check.

In response to the observed tailpipe $NO_x$ amount being higher 1210 than the expected $NO_x$ amount, in the low engine-out $NO_x$ regime 1202 the procedure in region 1218 determines the $NO_x$ sensor to be in error or to fail a sensor rationality check. In response to the observed tailpipe $NO_x$ amount being higher 1210 than the expected $NO_x$ amount, in the nominal engine-out $NO_x$ regime 1204, the procedure in region 1220 determines the $NO_x$ reduction capability is failed or allows the monitor to set a $NO_x$ reduction capability fault. In response observed tailpipe $NO_x$ amount being higher 1210 than the expected $NO_x$ amount, in the high engine out $NO_x$ region 1206, the example procedure in the region 1222 excludes the operations from affecting any sensor or system failures, and/or from allowing faults to be set or cleared.

Figure 9:
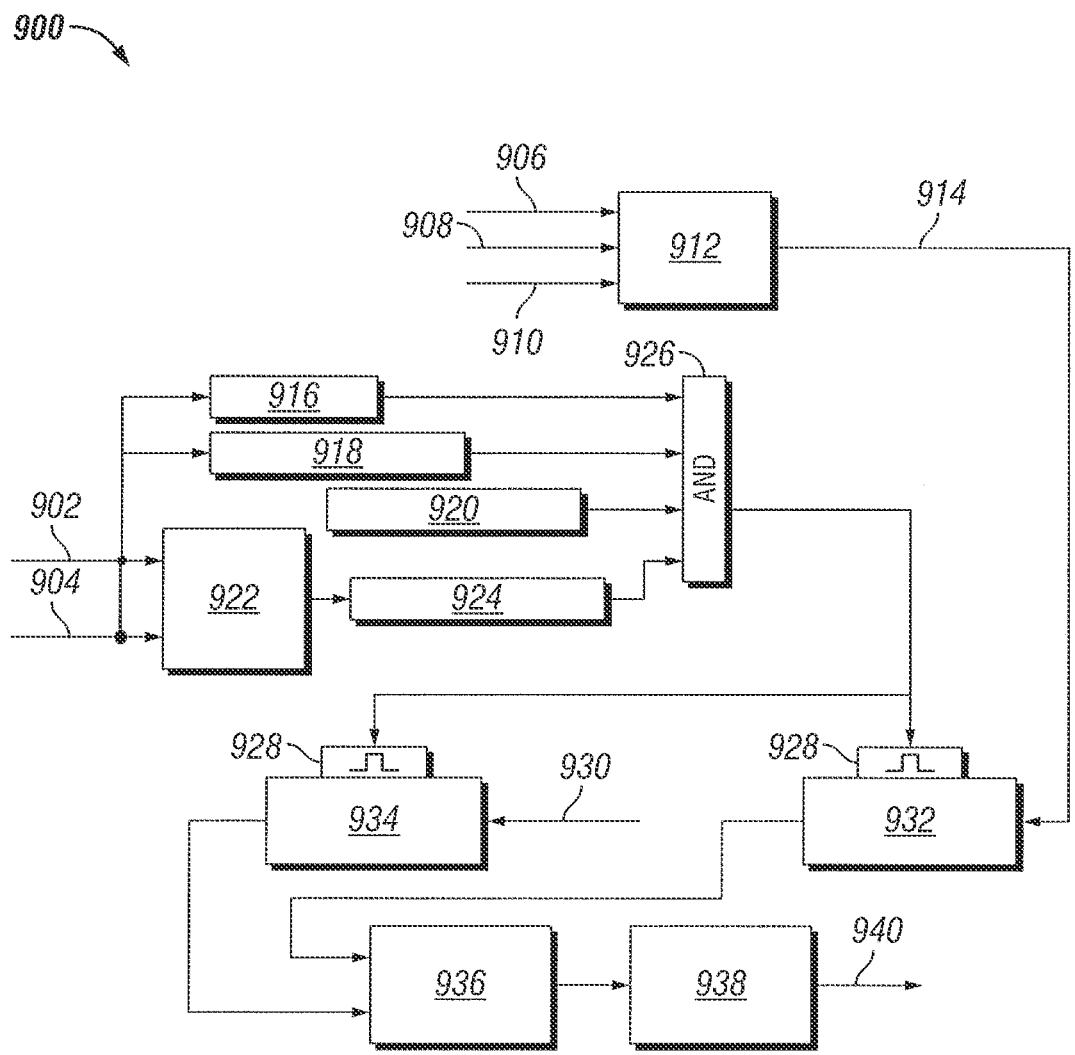
FIG. 9 is a schematic flow diagram of a procedure for monitoring a $NO_x$ reduction system $NO_x$ conversion amount.

Referencing FIG. 9, a schematic flow diagram illustrates a procedure 900 for monitoring a $NO_x$ reduction system. The procedure 900 includes an operation 916 to determine whether an engine fuel flow 902 and an engine mass flow 904 are below threshold values to perform a monitoring check of the $NO_x$ reduction system. The procedure 900 further includes an operation 918 to determine whether the rate of change of the engine fuel flow 902 and the engine mass flow 904 are below threshold values to perform the monitoring check of the $NO_x$ reduction system. The threshold values for the engine fuel flow 902 and engine mass flow 904, and the rates of change thereof, may be set for any reason, including without limitation controlling the test to occur within certain power or emissions limits, within certain catalyst space velocity limits, and/or within certain exhaust temperature limits. The outputs of the operations 916, 918 are input as logical values to an AND block 926. The procedure 900 further includes an operation 922 to determine whether a value of a $$\frac{FuelFlow}{ChargeFlow}$$

is between a high and low threshold. The value $$\frac{FuelFlow}{ChargeFlow}$$

may be determined according to any method; a lookup table utilizing fuel massflow 902 and charge massflow 904 is consistent with the depiction in the example. The procedure 900 further includes operations to determine whether data screening parameters 920 have values indicating the monitor should be performed.

In response to all of the logical values for the determining operations entering the AND block 926 being TRUE, the procedure 900 includes an enable operation 928 for each of the operations 932, 934. The procedure 900 further includes an operation 912 to determine an expected $NO_x$ emissions value 914. The example operation 912 utilizes an engine speed 916, an engine torque 918, and a weighting factor 910. The weighting factor 910 may be determined in response to various engine operation conditions, including at least an EGR fraction, a charge temperature, the timing of fueling, and/or a fuel rail pressure. Additionally or alternatively, any $NO_x$ model to determine an expected $NO_x$ emissions value is contemplated herein.

The procedure 900 further includes, in response to the enabling operation 928, calculating an average value of the expected NOx tailpipe a first operation 932 to calculate an average of a number of values of an expected $NO_x$ calculation over a period of time or execution cycles, and a second operation 934 to calculate an average of a number of values of a $NO_x$ sensor reading 930 over the period of time or execution cycles. The $NO_x$ sensor reading is interpreted from a $NO_x$ sensor positioned downstream of the $NO_x$ reduction catalyst of the $NO_x$ reduction system. The procedure 900 further includes an operation 936 to compare the averaged values, and an operation 938 to determine a fault value (increment, set, decrement, and/or clear) in response to the comparison.

An example set of embodiments is a method including determining whether a urea refill event is detected, and in response to the refill event being detected, clearing a urea quality accumulator value and clearing a latching abort command. The method includes determining whether urea fluid quality check abort conditions are met, and in response to the abort conditions being met, clearing the urea quality accumulator, latching the abort command, and exiting the reductant fluid quality check. The method further includes, in response to the abort conditions not being met, incrementing the urea quality accumulator according to an amount of urea being injected. The method further includes comparing the accumulated urea quantity to a low test threshold, and in response to the accumulated urea quantity being less than the low test threshold, exiting the current execution cycle of the reductant fluid quality check. The method further includes, in response to the accumulated urea quantity being greater than the low test threshold, comparing the accumulated urea quantity to a high test threshold, and in response to the urea quantity being greater than the high test threshold, determining whether the a $NO_x$ exceedance is observed and clearing a urea quality error in response to the $NO_x$ exceedance not being observed.

Certain further embodiments of the example method are described following. An example method includes in response to the accumulated urea quantity being less than the high test threshold, determining whether the a $NO_x$ exceedance is observed and setting a urea quality error in response to the $NO_x$ exceedance being observed and clearing the urea quality error in response to the $NO_x$ exceedance not being observed. An example method includes determining an averaged $\epsilon$ value including ANR/deNO$_x$ $\eta$ values taken at ammonia-to-NO$_x$ ratio (ANR) values below a $\beta$ value, wherein $\beta$ is approximately a stoichiometric ANR value, determining an averaged deNO$_x$ $\eta$ value comprising deNO$_x$ $\eta$ values taken above the $\beta$ value, and in response to the averaged $\epsilon$ value and the averaged deNO$_x$ $\eta$ value, determining whether a NO$_x$ reduction system is in a PASS or FAIL state. An example method further includes determining the state of the NO$_x$ reduction system in response to the averaged $\epsilon$ value and the averaged deNO$_x$ $\eta$ value comprises determining the NO$_x$ reduction system is in a PASS state in response to the averaged $\epsilon$ value and the averaged deNO$_x$ $\eta$ value both indicating a passing value. Additionally or alternatively, the method includes determining the state of the NO$_x$ reduction system in response to the averaged $\epsilon$ value and the averaged deNO$_x$ $\eta$ value by determining the NO$_x$ reduction system is in a failed state, with the failure being at least one of a urea injector and the urea in response to the averaged $\epsilon$ value indicating a failing value and the averaged deNO$_x$ $\eta$ value indicating a passing value. In certain embodiments, the method includes determining the failure to be a urea injector in response to the urea fluid quality error being one of cleared and not set.

An example method includes determining the state of the NO$_x$ reduction system in response to the averaged $\epsilon$ value and the averaged deNO$_x$ $\eta$ value by determining the NO$_x$ reduction system is in a failed state, with the failure being at least one of a NO$_x$ reduction catalyst and the urea in response to the averaged $\epsilon$ value indicating a failing value and the averaged deNO$_x$ $\eta$ value indicating a passing value. In certain embodiments, the method further includes determining the failure to be a NO$_x$ reduction catalyst in response to the urea fluid quality error being one of cleared and not set. In certain embodiments, the averaged deNO$_x$ $\eta$ value includes a normalized deNO$_x$ $\eta$ value. An example method includes each $\epsilon$ value determined for the averaged $\epsilon$ value being determined according any one of the terms selected from the equation:

$$\varepsilon = \frac{NH_3\_in}{NOx\_in - NOx\_out} = \frac{NH_3\_in/NOx\_in}{(NOx\_in - NOx\_out)/NOx\_in} = \frac{ANR}{DeNOx\_eff};$$

where $NH_{3\_in}$ is the $NH_3$ concentration into the deNO$_x$ catalyst, wherein $NO_{x\_in}$ is the NO$_x$ concentration into the deNO$_x$ catalyst, wherein the $NO_{x\_out}$ is the NO$_x$ concentration out of the deNO$_x$ catalyst.

An example method includes each deNO$_x$ $\eta$ value determined for the averaged deNO$_x$ $\eta$ value being determined according to the equation:

$$\eta_{Normalized} = \frac{\eta_{measured}}{\eta_{nominal}} = \frac{(NO_{x\_in} - NO_{x\_out})/NO_{x\_in}}{\eta_{nominal}}.$$

where $\eta_{Normalized}$ is the deNO$_x$ η value, and wherein $\eta_{nominal}$ is an expected deNO$_x$ efficiency.

Another example set of embodiments is a method including determining whether an engine fuel massflow and an engine charge massflow have values below threshold values, determining whether the engine fuel massflow and an engine charge massflow have rates of change below threshold values, determining whether a number of data screening parameters have values indicating that a NOx reduction system monitor operation can be performed, and determining whether a value of $$\frac{FuelFlow}{ChargeFlow}$$

is between a high and low threshold. The method further includes, in response to all of the logical values for the determining operations being TRUE, calculating an average of a number of values of an expected NO$_x$ calculation over a period of time or execution cycles, and calculating an average of a number of values of a NO$_x$ sensor reading over the period of time or execution cycles. The method includes comparing the averaged values and determining a fault value for a NO$_x$ reduction system NO$_x$ conversion capability in response to the comparing.

Certain further embodiments of the method are described following. An example method includes calculating an average of a number of values of an expected NO$_x$ calculation over a period of time or execution cycles by operating a NO$_x$ reduction model of the NO$_x$ reduction system. an example method includes calculating an average of a number of values of an expected NO$_x$ calculation over a period of time comprises using lookup values from a predetermined function of engine out NOx values as a function of $$\frac{FuelFlow}{ChargeFlow}$$

values. In certain further embodiments, the method includes the high and low thresholds of the $$\frac{FuelFlow}{ChargeFlow}$$

being validated operating ranges for the predetermined function, and/or the predetermined function being a linear increasing function with $$\frac{FuelFlow}{ChargeFlow}.$$

Yet another example set of embodiments is a method including determining an averaged ε value comprising ANR/deNO$_x$ η values taken at ammonia-to-NO$_x$ ratio (ANR) values below a β value, where β is approximately a stoichiometric ANR value for a NO$_x$ reduction system fluidly coupled to the exhaust of an internal combustion engine, determining an averaged deNO$_x$ η value being deNO$_x$ η values taken above the β value, and in response to the averaged ε value and the averaged deNO$_x$ η value, determining whether the NO$_x$ reduction system is in a PASS or FAIL state. In certain embodiments, the method includes determining the state of the NO$_x$ reduction system in response to the averaged ε value and the averaged deNO$_x$ η value by determining that the NO$_x$ reduction system is in a PASS state in response to the averaged ε value and the averaged deNO$_x$ η value both indicating a passing value. Additionally or alternatively, the method includes determining the state of the NO$_x$ reduction system in response to the averaged ε value and the averaged deNO$_x$ η value by determining the NO$_x$ reduction system is in a failed state, with the failure being at least one of a urea injector and a urea fluid quality, in response to the averaged ε value indicating a failing value and the averaged deNO$_x$ η value indicating a passing value, where the urea is a reductant fluid for the NO$_x$ reduction system and the urea injector is operationally coupled to the exhaust at a position upstream of a selective reduction catalyst. In certain further embodiments, the method includes determining the failure to be the urea injector in response to a urea fluid quality check passing the urea fluid quality.

In certain embodiments, the method includes determining the state of the NO$_x$ reduction system in response to the averaged ε value and the averaged deNO$_x$ η value by determining the NO$_x$ reduction system is in a failed state, with the failure being at least one of a NO$_x$ reduction catalyst and the urea, in response to the averaged 8 value indicating a failing value and the averaged deNO$_x$ η value indicating a passing value. In certain embodiments, the method includes determining the failure to be a NO$_x$ reduction catalyst in response to the urea fluid quality check passing the urea fluid quality. Additionally or alternatively, the averaged deNO$_x$ η value is a normalized deNO$_x$ η value.

In certain embodiments, the method includes each ε value determined for the averaged ε value to be determined according any one of the terms selected from the equation:

$$\varepsilon = \frac{NH_3\_in}{NOx\_in - NOx\_out} = \frac{NH_3\_in/NOx\_in}{(NOx\_in - NOx\_out)/NOx\_in} = \frac{ANR}{DeNOx\_eff};$$

where $NH_{3\_in}$ is the NH$_3$ concentration into the deNO$_x$ catalyst, wherein $NO_{x\_in}$ is the NO$_x$ concentration into the deNO$_x$ catalyst, wherein the $NO_{x\_out}$ is the NO$_x$ concentration out of the deNO$_x$ catalyst. In certain embodiments, the method includes each deNO$_x$ η value determined for the averaged deNO$_x$ η value to be determined according to the equation:

$$\eta_{Normalized} = \frac{\eta_{measured}}{\eta_{nominal}} = \frac{(NO_{x\_in} - NO_{x\_out})/NO_{x\_in}}{\eta_{nominal}}$$

where $\eta_{Normalized}$ is the deNO$_x$ η value, and wherein $\eta_{nominal}$ is an expected deNO$_x$ efficiency.

Still another example set of embodiments is a system including an internal combustion engine having an exhaust, a NO$_x$ reduction system having a selective catalytic reduction (SCR) catalyst, and a reductant injector operationally coupled to the exhaust at a position upstream of the SCR catalyst and receiving reductant from a reductant source. The system includes a means for determining a failure in one of the reductant injector, the SCR catalyst, and the reductant. In certain embodiments, the system includes the means for determining a failure further including a means for distinguishing a failure source between the reductant injector, the SCR catalyst, and the reductant. In still further embodiments, the system includes the means for determining a reductant failure including means for detecting a reductant source refill event, and accumulating an amount of reductant injected over a period of time following the reductant source refill event. In certain further embodiments, the system includes the means for determining a failure of the reductant injector in response to: a failed $\epsilon$ value, a passed normalized deNO$_x$ efficiency value, and the determining the failure of the reductant determines that the reductant is not failed. Additionally or alternatively, the system includes a means for determining a failure of the SCR catalyst in response to: a passed $\epsilon$ value, a failed normalized deNO$_x$ efficiency value, and the determining the failure of the reductant determines that the reductant is not failed.

Yet another example set of embodiments is a system including an internal combustion engine having an exhaust, a NO$_x$ reduction system having a selective catalytic reduction (SCR) catalyst, a reductant injector operationally coupled to the exhaust at a position upstream of the SCR catalyst and receiving reductant from a reductant source, and a means for determining a failure in the NO$_x$ reduction system in response to an engine-out NO$_x$ amount and a NO$_x$ measurement at a position downstream of the SCR catalyst. In certain embodiments, the means for determining a failure in the NO$_x$ reduction system determines the NO$_x$ reduction system is passed in response to the engine-out NO$_x$ amount in a middle range and the NO$_x$ measurement in a low range. Additionally or alternatively, the means for determining a failure in the NO$_x$ reduction system determines the NO$_x$ reduction system is failed in response to the engine-out NO$_x$ amount in a middle range and the NO$_x$ measurement in a high range. In certain embodiments, the means for determining a failure in the NO$_x$ reduction system determines a NO$_x$ sensor providing the NO$_x$ measurement is failed in response to the engine-out NO$_x$ amount in a high range and the NO$_x$ measurement in a low range. In certain embodiments, the means for determining a failure in the NO$_x$ reduction system determines a NO$_x$ sensor providing the NO$_x$ measurement is failed in response to the engine-out NO$_x$ amount in a low range and the NO$_x$ measurement in a high range.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for performing a reductant fluid quality check in a NO$_x$ reduction system with a controller, the NO$_x$ reduction system comprising a urea tank with the urea and a urea tank level sensor, the NO$_x$ reduction system further comprising a NO$_x$ reduction catalyst and a NO$_x$ sensor downstream of the NO$_x$ reduction catalyst, wherein the urea tank is con-ted to a urea injector for injection of the urea upstream of the NO$_x$ reduction catalyst, the method comprising:

refilling the urea tank;
outputting a signal from the urea tank level sensor indicating a urea refill event for urea in the urea tank of the NO$_x$ reduction system is detected;
determining whether urea fluid quality check abort conditions are met in response to the urea refill event being detected;
in response to the urea fluid quality check abort conditions being met, clearing a urea quantity accumulator value in the controller, clearing a latching abort command in the controller, and exiting a urea fluid quality check operable by the controller;
passing an exhaust flow with NO$_x$ through the NO$_x$ reduction catalyst and outputting a signal from the NO$_x$ sensor of a NO$_x$ amount measured downstream of the NO$_x$ reduction catalyst;
injecting an amount of urea from the urea tank with the urea injector upstream of the NO$_x$ reduction catalyst of the NO$_x$ reduction system and in response to the urea fluid quality check abort conditions not being met incrementing the urea quantity accumulator value according the amount of urea;
comparing an accumulated urea quantity injected by the urea injector from the urea tank to a low test threshold, and in response to the accumulated urea quantity being less than the low test threshold, exiting a current execution cycle of the urea fluid quality check;
in response to the accumulated urea quantity being greater than the low test threshold, comparing the accumulated urea quantity injected by the urea injector from the urea tank to a high test threshold, and in response to the accumulated urea quantity injected from the urea tank by the urea injector being greater than the high test threshold, determining from the signal output by the NO$_x$ sensor whether a NO$_x$ exceedance out of the NO$_x$ reduction catalyst is observed and clearing a urea quality error in the controller in response to the NO$_x$ exceedance not being observed.

2. The method of claim 1, further comprising, in response to the accumulated urea quantity being less than the high test threshold, determining whether the NO$_x$ exceedance is observed and setting a urea quality error in response to the NO$_x$ exceedance being observed and clearing the urea quality error in response to the NO$_x$ exceedance not being observed.

3. A method of claim 1, the method further comprising determining an averaged $\epsilon$ value comprising ANR/deNO$_x$ $\eta$ values taken at ammonia-to-NO$_x$ ratio (ANR) values below a $\beta$ value, wherein $\beta$ is a stoichiometric ANR value;
determining an averaged deNO$_x$ $\eta$ value comprising deNO$_x$ $\eta$ values taken above the $\beta$ value; and
in response to determining the averaged $\epsilon$ value and the averaged deNO$_x$ $\eta$ value, determining the NO$_x$ reduction system is in a PASS state or a FAIL state.

4. The method of claim 3, wherein determining the PASS state or the FAIL state of the NO$_x$ reduction system in response to the averaged $\epsilon$ value and the averaged deNO$_x$ $\eta$ value comprises determining the NO$_x$ reduction system is in the PASS state in response to the averaged $\epsilon$ value and the averaged deNO$_x$ $\eta$ value both indicating a passing value.

5. The method of claim 3, wherein determining the PASS irate or the FAIL state of the NO$_x$ reduction system in response to the averaged $\epsilon$ value and the averaged deNO$_x$ $\eta$ value comprises determining the NO$_x$ reduction system is in a failed state, with the failed state being at least one of the urea injector and the urea in response to the averaged $\epsilon$ value indicating a failing value and the averaged deNO$_x$ $\eta$ value indicating a passing value.

6. The method of claim 5, further comprising determining the failed state to be the urea injector in response to the urea fluid quality error being one of cleared and not set.

7. The method of claim 3, wherein determining the PASS state or the FAIL state of the $NO_x$ reduction system in response to the averaged $\epsilon$ value and the averaged $deNO_x$ $\eta$ value comprises determining the $NO_x$ reduction system is in a failed state, with the failed state being at least one of the $NO_x$ reduction catalyst and the urea in response to the averaged $\epsilon$ value indicating a passing value and the averaged $deNO_x$ $\eta$ value indicating a failing value.

8. The method of claim 7, further comprising determining the failed state to be the $NO_x$ reduction catalyst in response to the urea fluid quality error being one of cleared and not set.

9. The method of claim 3, wherein the averaged $deNO_x$ $\eta$ value comprises a normalized $deNO_x$ $\eta$ value.

10. The method of claim 3, wherein $\epsilon$ values for the averaged $\epsilon$ value are determined according any one of the equations:

$$\varepsilon = \frac{NH_3\_in}{NOx\_in - NOx\_out} = \frac{NH_3\_in/NOx\_in}{(NOx\_in - NOx\_out)/NOx\_in} = \frac{ANR}{DeNOx\_eff};$$

wherein $NH_{3\_in}$ is an $NH_3$ concentration into the $NO_x$ reduction catalyst, wherein $NO_{x\_in}$ is an $NO_x$ concentration into the $NO_x$ reduction catalyst, wherein the $NO_{x\_out}$ is an $NO_x$ concentration out of the $NO_x$ reduction catalyst, wherein ANR is an ammonia-to-$NO_x$ ratio value, and wherein $DeNO_x\_eff$ is a $NO_x$ removal efficiency of the $NO_x$ reduction catalyst.

11. The method of any one of claim 9, wherein a $deNO_x$ $\eta$ value determined for the averaged $deNO_x$ $\eta$ value is determined according to the equation:

$$\eta_{Normalized} = \frac{\eta_{measured}}{\eta_{nominal}} = \frac{(NO_{x\_in} - NO_{x\_out})/NO_{x\_in}}{\eta_{nominal}}$$

wherein $\eta_{Normalized}$ is the $deNO_x$ $\eta$ value, and wherein $\eta_{nominal}$ is an expected $deNO_x$ efficiency, wherein $NO_{x\_in}$ is a $NO_x$ concentration into the $NO_x$ reduction catalyst, wherein $NO_{x\_out}$ is a $NO_x$ concentration out of the $NO_x$ reduction catalyst.

12. A method for performing a check of a $NO_x$ reduction system with a controller, the $NO_x$ reduction system comprising a urea tank for storing urea and a urea tank level sensor, the $NO_x$ reduction system further comprising a $NO_x$ reduction catalyst and a urea injector operationally coupled for injection of urea upstream of the $NO_x$ reduction catalyst, the $NO_x$ reduction system further comprising at least one $NO_x$ sensor and the method comprising:

operating an internal combustion engine to produce an exhaust flow with $NO_x$ that is received by the $NO_x$ reduction system;

injecting urea from the urea tank into the exhaust flow upstream of the $NO_x$ reduction catalyst with the urea injector;

outputting a signal from the at let one $NO_x$ sensor indicative of a $NO_x$ amount downstream of the $NO_x$ reduction catalyst;

outputting an engine out $NO_x$ amount and an ammonia amount upstream of the $NO_x$ reduction catalyst;

determining, with the controller in response to the signal indicating the $NO_x$ amount downstream of the $NO_x$ reduction catalyst, the engine out $NO_x$ amount and the ammonia amount, an averaged $\epsilon$ value for the $NO_x$ reduction catalyst comprising $ANR/deNO_x$ $\eta$ values taken at ammonia-to-$NO_x$ ratio (ANR) values below a $\beta$ value, wherein $\beta$ is a stoichiometric ANR value for the $NO_x$ reduction system;

determining an averaged $deNO_x$ $\eta$ value for the $NO_x$ reduction catalyst comprising $deNO_x$ $\eta$ values taken above the $\beta$ value during operation of the internal combustion engine; and in response to determining the averaged $\epsilon$ value and the averaged $deNO_x$ $\eta$ value, outputting a signal from the controller indicating that the $NO_x$ reduction system is in one of a PASS state or a FAIL state.

13. The method of claim 12, wherein determining the PASS state or the FAIL state of the $NO_x$ reduction system in response to the averaged $\epsilon$ value and the averaged $deNO_x$ $\eta$ value comprises determining the $NO_x$ reduction system is in the PASS state in response to the averaged $\epsilon$ value and the averaged $deNO_x$ $\eta$ value both indicating a passing value.

14. The method of claim 12, wherein determining the PASS state or the FAIL state of the $NO_x$ reduction system in response to the averaged $\epsilon$ value and the averaged $deNO_x$ $\eta$ value comprises determining the $NO_x$ reduction system is in a failed state, with the failed state being at least one of the urea injector and a urea fluid quality of the urea in response to the averaged $\epsilon$ value indicating a failing value and the averaged $deNO_x$ $\eta$ value indicating a passing value.

15. The method of claim 14, further comprising determining the failed state to be the urea injector in response to a urea fluid quality check passing the urea fluid quality.

16. The method of claim 12, wherein determining the PASS state or the FAIL of the $NO_x$ reduction system in response to the averaged $\epsilon$ value and the averaged $deNO_x$ $\eta$ value comprises determining the $NO_x$ reduction system is in a failed state, with the failed state being at least one of the $NO_x$ reduction catalyst and the urea in response to the averaged $\epsilon$ value indicating a passing value and the averaged $deNO_x$ $\eta$ value indicating a failing value.

17. The method of claim 16, further comprising determining the failure to be the $NO_x$ reduction catalyst in response to the urea fluid quality check passing the urea fluid quality.

18. The method of claim 12, wherein the averaged $deNO_x$ $\eta$ value comprises a normalized $deNO_x$ $\eta$ value.

19. The method of claim 12, wherein $\epsilon$ values for the averaged $\epsilon$ value are determined according any one of the following equations $$\varepsilon = \frac{NH_3\_in}{NOx\_in - NOx\_out} = \frac{NH_3\_in/NOx\_in}{(NOx\_in - NOx\_out)/NOx\_in} = \frac{ANR}{DeNOx\_eff};$$

wherein $NH_{3\_in}$ is an $NH_3$ concentration into a $NO_x$ reduction catalyst, wherein $NO_{x\_in}$ is an $NO_x$ concentration into the $NO_x$ reduction catalyst, wherein an $NO_{x\_out}$ is the $NO_x$ concentration out of the $NO_x$ reduction catalyst, wherein ANR is an ammonia-to-$NO_x$ ratio value, and wherein $DeNO_x\_eff$ is a $NO_x$ removal efficiency of the $NO_x$ reduction catalyst.

20. The method of claim 12, wherein a $deNO_x$ $\eta$ value determined for the averaged $deNO_x$ $\eta$ value is determined according to the equation:

$$\eta_{Normalized} = \frac{\eta_{measured}}{\eta_{nominal}} = \frac{(NO_{x\_in} - NO_{x\_out})/NO_{x\_in}}{\eta_{nominal}}$$

wherein $\eta_{Normalized}$ is the deNO$_x$ $\eta$ value, and wherein $\eta_{nominal}$ is an expected deNO$_x$ efficiency, wherein NO$_{x\_in}$ is an NO$_x$ concentration into the NO$_x$ reduction catalyst, wherein an NO$_{x\_out}$ is the NO$_x$ concentration out of the NO$_x$ reduction catalyst.

* * * * *